(12) United States Patent
Tortora et al.

(10) Patent No.: US 11,275,341 B2
(45) Date of Patent: Mar. 15, 2022

(54) TIMEPIECE COMPRISING A MOVABLE ELEMENT PROVIDED WITH A LUMINOUS INDEX

(71) Applicant: The Swatch Group Research and Development Ltd, Marin (CH)

(72) Inventors: Pierpasquale Tortora, Neuchâtel (CH); Cédric Blatter, Commugny (CH)

(73) Assignee: The Swatch Group Research and Development Ltd, Marin (CH)

( * ) Notice: Subject to any disclaimer, the term of this patent is extended or adjusted under 35 U.S.C. 154(b) by 103 days.

(21) Appl. No.: 16/684,791

(22) Filed: Nov. 15, 2019

(65) Prior Publication Data
US 2020/0192294 A1 Jun. 18, 2020

(30) Foreign Application Priority Data
Dec. 14, 2018 (EP) .................................... 18212786

(51) Int. Cl.
*G02B 6/00* (2006.01)
*G04B 19/32* (2006.01)
*F21V 8/00* (2006.01)

(52) U.S. Cl.
CPC ........... *G04B 19/32* (2013.01); *G02B 6/0003* (2013.01); *G02B 6/0053* (2013.01); *G02B 6/0058* (2013.01); *G02B 6/0088* (2013.01)

(58) Field of Classification Search
CPC ...... G04B 19/30; G04B 19/32; G04B 19/283; G04B 19/18; G02B 6/0003; G02B 6/0053; G02B 6/0058; G02B 6/0088
See application file for complete search history.

(56) References Cited

U.S. PATENT DOCUMENTS

| 2009/0109801 A1* | 4/2009 | Winkler ................. G04B 19/30 368/227 |
| 2012/0082012 A1 | 4/2012 | Blanckaert et al. |
| 2013/0083508 A1 | 4/2013 | Murata et al. |

(Continued)

FOREIGN PATENT DOCUMENTS

| CN | 102460313 A | 5/2012 |
| CN | 103034112 A | 4/2013 |

(Continued)

OTHER PUBLICATIONS

European Search Report For EP 18 21 2786 dated May 10, 2019.
(Continued)

*Primary Examiner* — Y M. Quach Lee
(74) *Attorney, Agent, or Firm* — Sughrue Mion, PLLC

(57) ABSTRACT

The invention concerns a timepiece (1), notably a diver's watch, comprising a case (2) provided with a case middle (3), a light source (6), an element (4) movable between several positions relative to the case (2), and movable means for assembling the movable element (4) on the middle part (3) of the case (2). More particularly, the movable element (4) includes a light guide (10) and an upper cover (9) comprising an index (5), the guide (10) being configured to receive a light beam (8) from the light source through an entry face (12), and to guide light rays (18) through an exit face (15) of the light guide (10) in order to illuminate the index (5), whatever the position of the movable element (4) relative to the case (2).

17 Claims, 3 Drawing Sheets

(56) References Cited

U.S. PATENT DOCUMENTS

2015/0346688 A1 12/2015 Tortora et al.
2015/0346691 A1 12/2015 Tortora et al.

FOREIGN PATENT DOCUMENTS

| CN | 105278312 A   | 1/2016  |
|----|---------------|---------|
| CN | 207008292 U   | 2/2018  |
| EP | 1760547 A2    | 3/2007  |
| EP | 2950166 A1    | 12/2015 |
| EP | 2950168 A1    | 12/2015 |
| JP | 2-2689 U      | 1/1990  |
| JP | 2004-184196 A | 7/2004  |
| JP | 2013-501210 A | 1/2013  |
| JP | 2015-072270 A | 4/2015  |

OTHER PUBLICATIONS

Translation of Communication dated Dec. 1, 2020, from the Japanese Patent Office in application No. 2019214072.
Communication dated Dec. 28, 2020, from the State Intellectual Property Office of the P.R.C in application No. 201911294840.2.
Notice of the Reason for Refusal dated Apr. 6, 2021 from the Japanese Patent Office in JP Application No. 2019-214072.

* cited by examiner

TIMEPIECE COMPRISING A MOVABLE ELEMENT PROVIDED WITH A LUMINOUS INDEX

CROSS-REFERENCE TO RELATED APPLICATIONS

This application claims priority to European Patent Application No. 18212786.0, filed on Dec. 14, 2018, the entire contents of which are incorporated herein by reference.

FIELD OF THE INVENTION

The invention concerns a timepiece, notably a watch, comprising a movable element provided with a luminous index. The timepiece is, for example, configured to be able to be immersed in seawater, like a diver's watch.

STATE OF THE ART

In the field of timepieces having a case provided with a case middle, it is known to arrange on the case middle a movable element provided with at least one luminous index. For example, in the case of a diver's watch, the movable element may be a rotating bezel and the index, for example, indicates a reference position for the diver to measure his immersion time in the sea. To achieve this, the diver rotates the bezel in order to align the index with the minute hand. This position then becomes the reference for measuring elapsed time. One of the main criteria for efficiency of a diver's watch must be the legibility of the time and of the index during the immersion phase.

To meet this constraint, a known solution consists in coating the bezel index and the watch hands with a phosphorescent material. This makes the index and the hands more visible in low lighting conditions, typically several metres underwater. Such a diver's watch is, for example, disclosed in French Patent Application No. FR1572837A. However, the index has a much smaller surface than the hands, so that it remains much less visible in the water than the hands, even with the phosphorescent material. Further, the phosphorescent elements emit light for a duration limited to a few hours and in a decreasing manner (type of phosphorus, quantity, duration and intensity of charging before the dive). Further, this solution requires the phosphorescent elements to be previously charged in sunlight or with an artificial light source.

Watches having a dial provided with several luminous indices are also known, allowing information on the dial to be read in the dark as well as in broad daylight.

Such a wristwatch is, for example, disclosed in WO Patent Application No. 2016146350 A1. The watch includes a watch case, a rotating bezel mounted on the watch case and a dial provided with several luminous indices. The luminous indices are illuminated through the dial by a light source disposed underneath the dial and powered by an electrical energy source such as a cell or rechargeable storage battery. A light source activation component is housed inside the rotating bezel and cooperates with a detection component housed inside the watch case. Thus, the user can switch on the light source by pivoting the rotating bezel and moving it into a predetermined position in which the presence of the activation component is detected by the detection component which, in response, switches on the light source; in this case, the bezel acts like a switch.

However, the light source cannot illuminate an index which is arranged on the bezel, since the light does not reach the bezel, which is generally arranged on the middle part of the case and not on the dial. Further, it is not possible to place a light source in the bezel without having problems of connection to the electrical power supply of the light source. Indeed, in such a configuration, the light source is movable with the bezel, while the power supply remains fixed in the case. Further, during immersion, water seeps in between the bezel and the case middle, which could cause a short circuit at the connection.

SUMMARY OF THE INVENTION

It is therefore an object of the invention to provide a timepiece comprising a movable element provided with an index able to be illuminated by a light source in low lighting conditions, particularly underwater. In particular, the movable element is simple to use, and does not requiring prior charging of phosphorescent elements, or using a movable light source associated with the movable element.

To this end, the invention concerns a timepiece, notably a diver's watch, comprising a case provided with a case middle, a light source, an element movable between several positions relative to the case, and movable means for assembling the movable element on the case middle.

According to the invention, the movable element includes a light guide and an upper cover comprising an index, the guide being configured to receive a light beam from the light source through an entry face, and to guide light rays through an exit face of the light guide in order to illuminate the index, whatever the position of the movable element relative to the case.

Specific embodiments of the watch are defined in the dependent claims 2 to 17.

One advantage of such a watch, according to the invention, lies in the use of a light guide in the movable element. The light guide guides a light beam produced by a light source to the index so that the index is seen, especially in a dark environment. This result is obtained regardless of the position of the movable element relative to the timepiece case, and that of the light source. Indeed, since the light guide is movable with the index, it can guide the light to the index in any position of the movable element on the case middle.

This offers a particularly simple solution for illuminating the index in low lighting conditions underwater, without requiring prior charging of the index.

Moreover, this allows the movable element, for example a diver's watch bezel, to take different positions while keeping the index illuminated by a light source arranged in a specific location in the timepiece. This avoids the use of a movable light source, which would have to be placed under or inside the movable element, which would cause connection problems for powering the source. The dimensions of the movable element would be further impacted if a light source were integrated in the movable element.

This configuration also offers several possibilities for positioning the light source and the element in or on the timepiece case. Thus, space can be saved by avoiding having to place the light source in direct proximity to the index.

According to a preferred embodiment of the invention, the element is an annular bezel mounted to rotate around the case middle.

According to a particular technical feature of the invention, the light guide has a closed ring shape having a flat lower face forming the entry face of the guide and extending under the whole ring. In this way, substantially constant illumination of the index is obtained regardless of the position of the movable element on the case middle, since the light rays are guided in the ring by the two sides of the ring, to reach the index. Light losses on one side are compensated by the other side.

Advantageously, the light guide has a rectangular cross-section, the faces of the guide reflecting light rays to guide them towards the index.

Advantageously, the light guide has a circular cross-section, the faces of the guide reflecting light rays to guide them towards the index.

Advantageously, the guide has an upper face connected to the upper cover, preferably in permanent contact with the upper cover.

According to a preferred embodiment of the invention, the exit face is part of the upper face of the guide opposite the index.

Advantageously, the light source is arranged facing a part of the entry face, the light beam being intended to be projected from the source around an axis substantially perpendicular to the entry face.

According to a particular technical feature of the invention, the guide includes a light deflection structure arranged underneath the index to deflect part of the light beam towards the index.

Advantageously, the deflection structure comprises prisms formed in the lower face of the guide.

Advantageously, the prisms have a surface at forty-five degree to the exit face of the light guide to deflect the light rays.

Advantageously, the prisms have a parabolic or concave surface to deflect light rays.

According to a preferred embodiment of the invention, the light guide contains fluorescent and/or phosphorescent pigments to form a secondary source inside the guide.

According to a particular technical feature of the invention, the light guide is formed of a one-piece material.

Advantageously, the one-piece material is coated with a cladding type layer, the layer having a lower refractive index than that of the material, to avoid light losses.

According to a particular technical feature of the invention, the light guide is formed of at least two blocks, the fluorescent and/or phosphorescent pigments being placed between the blocks.

According to a preferred embodiment of the invention, the light source is arranged in the case middle in a permanent location with respect to the case.

Advantageously, the light guide is at least partly arranged between the light source and the upper cover.

According to a particular technical feature of the invention, the movable element includes a filter arranged to dim the brightness or to change the colour spectrum according to the positions of the element, the filter preferably being placed between the source and the light guide.

According to a particular technical feature of the invention, the index is formed of an opening made in the upper cover to allow the passage of light from the exit face of the guide outside the movable element, said opening preferably being provided with a window. Preferably, the window is made of sapphire.

Advantageously, at least one of the free surfaces of the sapphire is frosted. This makes it possible to better diffuse the light emitted by the light source device and to increase the viewing angle of the illuminated index.

Advantageously, the watch further includes an external actuator or an immersion sensor to start the illumination of the index.

Advantageously, the index is configured to flash to indicate an important moment or the end of a predefined duration.

BRIEF DESCRIPTION OF THE DRAWINGS

The objects, advantages and features of the timepiece according to the invention will appear more clearly in the following description, based on at least one non-limiting embodiment illustrated by the drawings, in which.

DETAILED DESCRIPTION OF THE INVENTION

Figure 1:
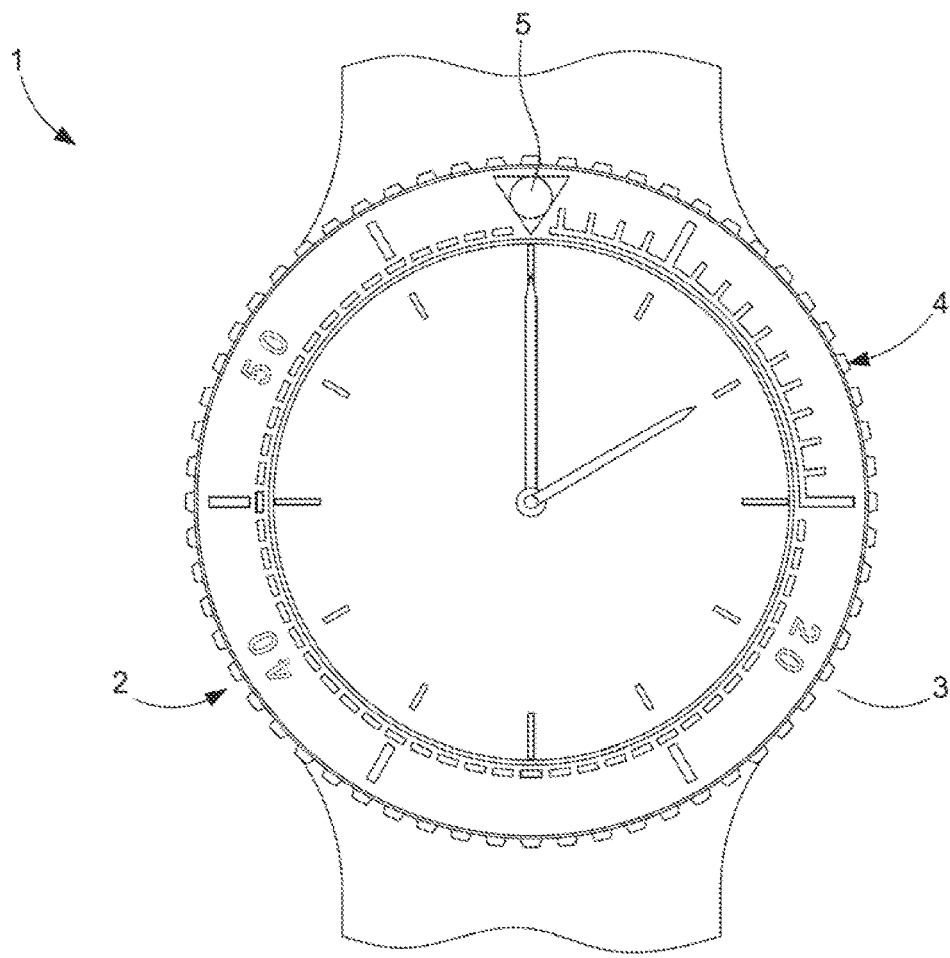
FIG. 1 is a top view of a timepiece, here a watch, according to a preferred embodiment of the invention, the timepiece comprising a movable element, here a bezel, provided with an index.
Figure 2:
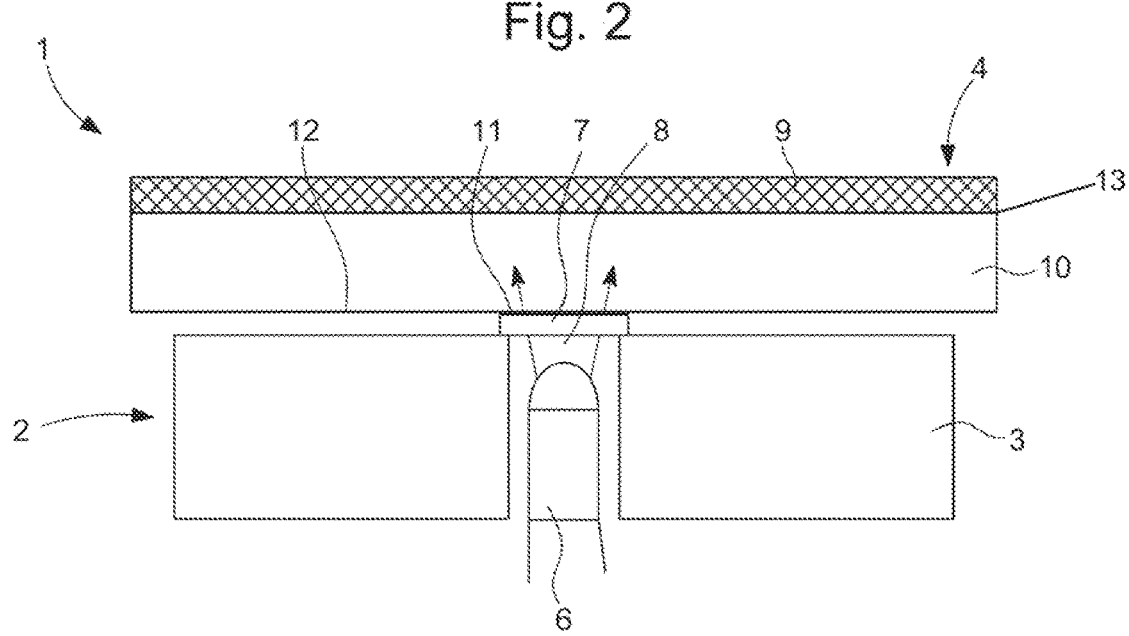
FIG. 2 is a sectional view of the inside of the watch of FIG. 1, according to a preferred embodiment of the invention, the watch comprising a movable element and a light source.

FIGS. 1 and 2 represent a timepiece 1, notably a diver's watch, provided with a watch case 2. Watch case 2 includes a case middle 3 carrying a movable element 4 able to move between several positions with respect to case 2. Movable element 4 includes movable means for assembling the element on the case middle, not represented in the Figures. The assembly means allow the movable element to move into the various positions while remaining attached to middle part 3 of case 2. In the illustrative example of FIG. 1 where element 4 is an annular rotating bezel, movable element 4 is provided with at least one luminous index 5.

In the embodiments illustrated in FIGS. 1 to 8, movable element 4 is an annular rotating bezel mounted to rotate around case middle 3. The rotating bezel is, for example, clipped onto case middle 3 and covers the latter, the movable securing means being formed of fastening clips. In the illustrative example of FIG. 1, watch 1 is a diver's watch and the rotating bezel has only one index 5. Index 5 is a luminous index for forming a reference position, for example for the diver to measure his immersion time in water. However, the present invention is not limited to a diver's watch having an annular rotating bezel but applies more generally to any timepiece having a case middle carrying a movable element provided with at least one index which one wishes to see in the dark.

Index 5 is, for example, formed of an opening arranged in element 4 to allow the passage of light. The opening is preferably closed by a closure element or window able to let in light. Preferably, the window is made of sapphire. Also, preferably, at least one of the free surfaces of the window, which in this case is made of sapphire, is frosted.

As represented in FIG. 2, and in FIGS. 5 to 8, timepiece 1 includes a light source 6 configured to emit a light beam 8. Light source 6 is arranged in middle part 3 of case 2 at a specific fixed location. Movable element 4 is therefore movable with respect to light source 6. In the illustrative example of FIGS. 2 and 4 to 8, light source device 6 comprises a single light emitting diode. It will also be noted that the light source according to the invention is energetically autonomous so that it can be fitted both to a watch having a mechanical movement and to a watch having an electronic or hybrid movement. Finally, the use of an LED as the preferred light source to indicate the diving index advantageously makes it possible to choose the colour of the latter, since the range of LED colours covers a wide colour palette unlike phosphorescent materials which are always orange, green or light blue. A person who usually dives in blue water will find it advantageous to choose a yellow LED in order to obtain maximum contrast. Likewise, a person who usually dives in greenish water will advantageously choose a red LED. Light source 6 can also include a resistor connected in series to the light emitting diode. Such a resistor, not represented in the Figures, is intended to limit the current flowing through the light emitting diode and thus to protect the latter. This makes it possible to guarantee a constant current in the circuit of the light emitting diode. Light source 6 is advantageously provided with a sealed window 7 to protect it from seawater, the window being carried by case middle 3. Light source 6 allows illumination of the index through the configuration of movable element 4.

To this end, movable element 4 comprises an upper cover 9 including the index and a light guide 10 associated with upper cover 9. Cover 9 and light guide 10 are superposed, so that guide 10 is placed between middle part 3 of case 2 and cover 9. Thus, light guide 10 is arranged at least partly between light source 6 and upper cover 9. Upper cover 9 is preferably made of metal or ceramic. Guide 10 is configured to receive light beam 8 from light source 6 through an entry face 12, and to bring light rays 18 to the index through an exit face.

Figure 3:
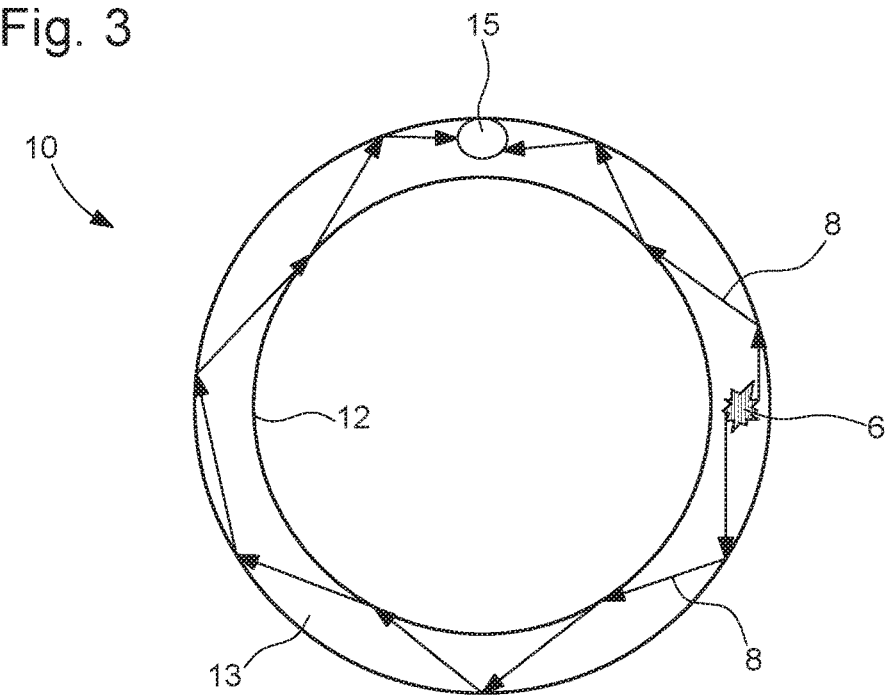
FIG. 3 is a top view of a light guide of a movable element of the watch of FIG. 1.

Movable element 4 is circular and rotates around an axis of rotation, preferably passing through the centre of the timepiece. Light source 6 is arranged at a certain distance from the centre of the circular ring, this distance being substantially equal to the radius of the circular ring. Thus, when movable element 4 changes position, it still has a part of light guide 10 above light source 6. Light source 6 is arranged facing a part 11 of entry face 12, light beam 8 being intended to be projected from the source around an axis substantially perpendicular to entry face 12 whatever the position of the movable element. In FIG. 3, light guide 10 is thus also circular. Thus, whatever the position of the movable element with respect to the case, guide 10 brings light rays 18 to the index. To this end, light guide 10 has a closed ring shape.

In a first variant, guide 10 has a rectangular cross section, so that the faces of the guide reflect light rays 18 to direct them towards index 5. Light guide 10 is provided with a flat lower face forming entry face 12 of the guide, and extending under the entire ring, and an upper face 13. Whatever the position of the movable element, the light source is opposite at least one part of the entry face of the guide. Upper face 13 is connected to the upper cover, preferably by permanent securing means. Upper face 13 is preferably also flat. Entry face 12 of the guide is thus opposite upper face 13. Exit face 15 of guide 10 is formed by a part of upper face 13 of the guide opposite the index opening. Exit face 15 of the guide is the same whatever the position of movable element 4.

In a second variant, not represented in the Figures, the light guide has a circular cross-section, the faces of the guide reflecting light rays to guide them towards the index.

Figure 4:
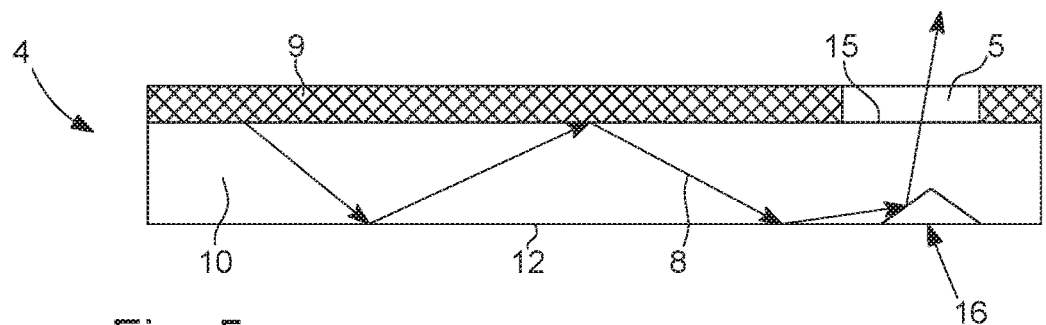
FIG. 4 is a schematic representation of the path of the light rays inside the light guide and their exit through the exit face and the index.
Figure 5:
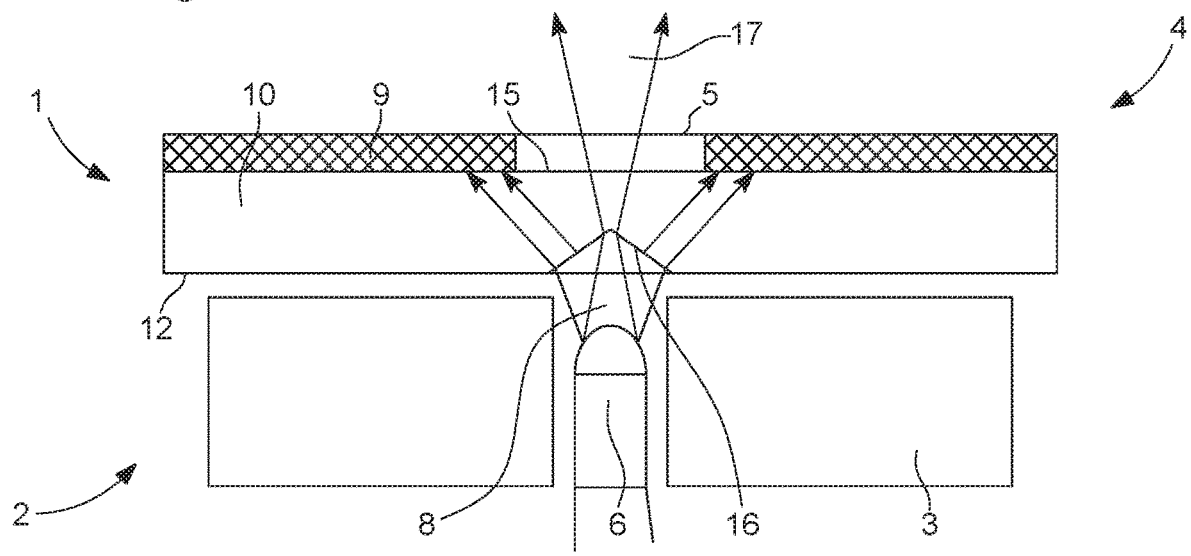
FIG. 5 is a sectional view of the inside of the watch of FIG. 1, when the index is placed directly on top of the light source.

As represented in FIGS. 4 and 5, guide 10 includes a light deflection structure 16 to deflect at least part of light rays 18 propagating inside guide 10 towards index 5, and thus allow them to pass through exit face 15 of guide 10 and index 5 of upper cover 9, outside movable element 4. For example, deflection structure 16 includes prisms formed on exit face 12 of guide 10. The prisms have a recessed shape on the lower face. Thus, when part of light rays 18 meets the prisms, it is deflected towards index 5. The prisms also have the function of reducing the size of the beam 8 projected by the source directly towards the index when movable element 4 is in a position placing the index above light source 6. This effect is seen in FIG. 5, where only a central portion 17 of beam 8 passes through guide 10 to reach index 5. The other part of the beam is deflected in the guide and does not reach index 5. This therefore prevents a difference in intensity of index 5 between this precise position and the other positions that movable element 4 can take. It is also possible to deposit a metal layer on one part of the prism to prevent part of the beam from passing, the apex of the prism being uncovered to allow the passage of part of the beam.

In a first variant, the prisms have a surface at forty five degrees with respect to exit face 15 of light guide 10 to deflect light rays 18.

In a second variant, not represented in the Figures, the prisms have a parabolic or concave surface to deflect the light rays.

Figure 6:
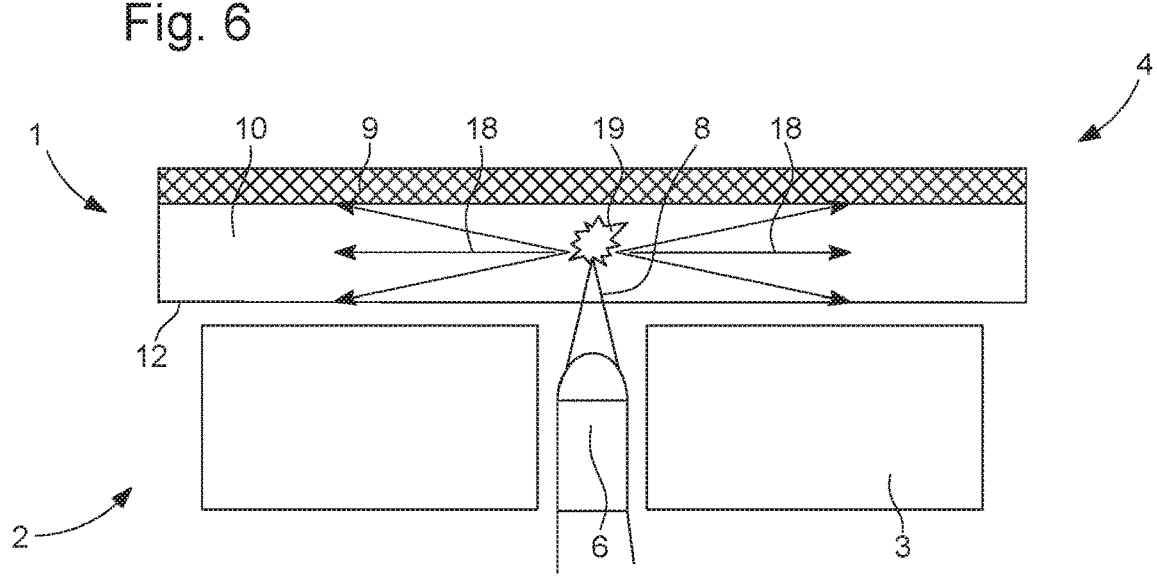
FIG. 6 is a sectional view of the inside of the watch of FIG. 1, when a secondary source is created in the light guide by the light source and the fluorescent and/or phosphorescent pigments.

In a preferred embodiment of the invention, light guide 10 contains fluorescent and/or phosphorescent pigments. As can be seen in FIG. 6, the fluorescent and/or phosphorescent pigments are illuminated by light source 6 and re-emit light rays 18 in all directions. Thus, a secondary source 19 is formed inside light guide 10. Light rays 18 whose angle of incidence on the faces of guide 10 corresponds to a predefined value are reflected and propagate inside guide 10. These are the light rays 18 re-emitted by the luminous pigments, which will illuminate the index in this embodiment. The predefined value is determined by the nature of the materials, in particular their refractive indices.

According to the first embodiment of the invention, light guide 10 is one-piece, i.e. it is made in a single piece. The pigments are mixed in the mass of the material forming the light guide. Advantageously, one-piece light guide 10 is coated with a cladding type layer, the layer preferably having a lower refractive index than that of the material, to prevent light losses.

Figure 7:
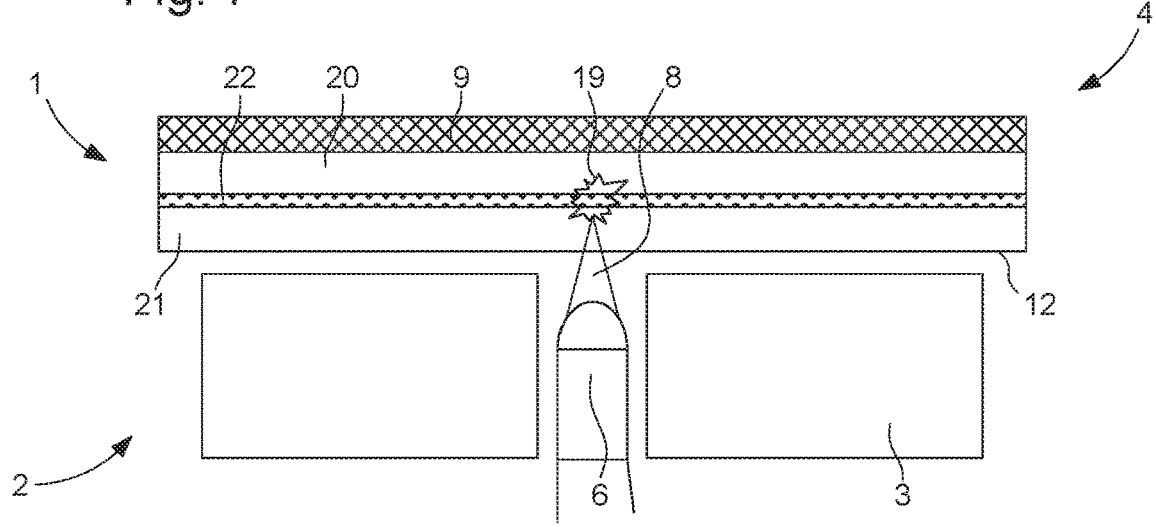
FIG. 7 is a sectional view of the inside of a watch according to a second embodiment wherein the light guide is formed of two blocks.

According to a second embodiment of the invention, represented in FIG. 7, light guide 10 is formed of at least two assembled blocks, here two blocks 20, 21. Each block 20, 21 has, for example, a flat ring shape, the two rings being superposed to form light guide 10. The pigments are inserted at the interface between the two blocks 20, 21 prior to their assembly. Consequently, a fluorescent and/or phosphorescent layer 22 is obtained between the two blocks 20, 21, which produces a secondary source when part of the layer is illuminated by light source 6. Advantageously, one-piece light guide 10 is coated with a cladding type layer, the layer preferably having a lower refractive index than that of the material, to prevent light losses.

According to a variant of the first and of the second embodiment, the pigment concentration in the guide varies to produce a different brightness of the index according to the position of the movable element on the case.

According to another variant of the first and of the second embodiment, different coloured pigments are used in the guide to obtain a different colour of the index according to the position of the movable element on the case. Thus, the colour of the index makes it easy to recognise its position with respect to the case.

Figure 8:
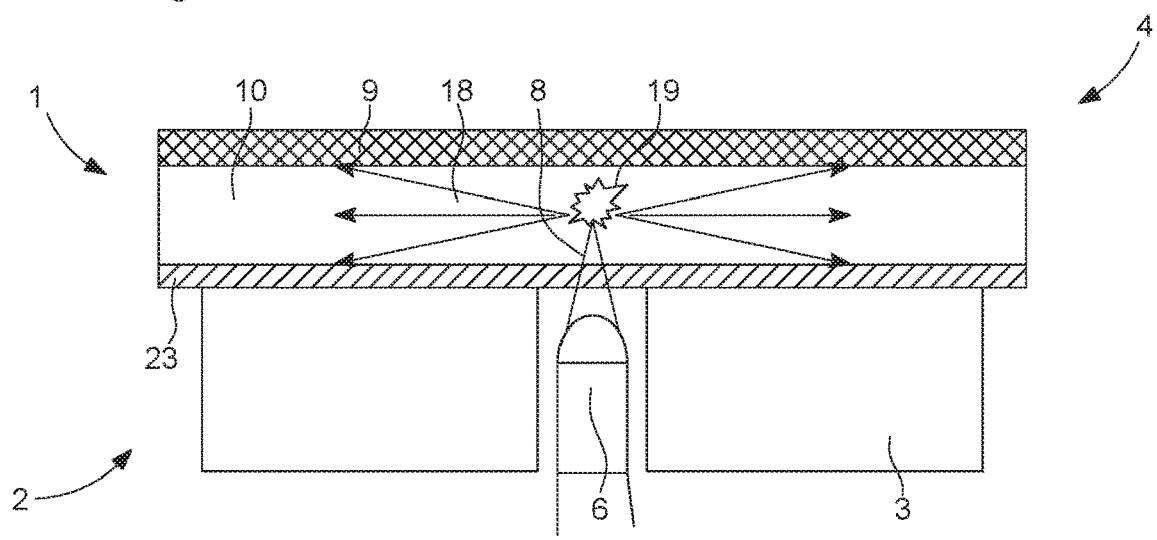
FIG. 8 is a sectional view of the inside of a watch according to a third embodiment, wherein the movable element includes a light filter.

In a third embodiment of the invention, represented in FIG. 8, movable element 10 has a filter 23. Preferably, filter 23 is disposed between source 6 and light guide 10. Filter 23 is, for example, a circular ring fixed underneath guide 10.

In a first variant, filter 23 dims the brightness according to the positions that movable element 4 can take. Filter 23 is preferably not homogeneous to obtain a different brightness according to the positions of the movable element.

In a second variant, filter 23 changes the spectrum according to the positions that movable element 4 can take. Thus, the light has different colours according to the positions that movable element 4 takes.

Also, preferably, in a variant, the timepiece can also include an external actuator; the actuator is not shown in the Figures for reasons of clarity. The external actuator is, for example, formed of a push button. Thus, pressing the push button causes the illumination of the index.

In a variant, the timepiece can also include an immersion sensor to automatically start the illumination of the index. Thus, as soon as the timepiece is immersed, the light source turns on and causes the illumination of the index.

Advantageously, the index is configured to flash to indicate an important moment or the end of a predefined duration. For example, when it is necessary to return to the surface during a scuba dive because the amount of air in the bottles will no longer be sufficient, the index flashes to warn the diver.

The preceding description of the watch according to the invention was made with reference to an element provided with a single index and with reference to a single light source device. However, those skilled in the art will understand that the invention applies in the same manner to watches comprising a plurality of indices or with several light source devices.

The invention claimed is:

1. A timepiece (1), notably a diver's watch, comprising: a case (2) provided with a case middle (3),
    a light source (6),
    an element (4) movable between several positions relative to the case (2), and
    movable means for assembling the movable element (4) on the middle part (3) of the case (2),
    wherein the movable element (4) comprises a light guide (10) and an upper cover (9) including an index (5), the guide (10) being configured to receive a light beam (8) from the light source through an entry face (12), and to guide light rays (18) through an exit face (15) of the light guide (10) in order to illuminate the index (5), whatever the position of the movable element (4) relative to the case (2).

2. The timepiece (1) according to claim 1, wherein the index (5) is formed of an opening made in the upper cover (9) to allow the passage of light from the exit face (15) of the guide (10) outside the movable element (4), said opening preferably being provided with a window.

3. The timepiece (1) according to claim 1, wherein the movable element (4) is an annular bezel mounted to rotate around the case middle (3).

4. The timepiece (1) according to claim 3, wherein the light guide (10) has a closed ring shape having a flat lower face forming the entry face (12) of the guide (10) and extending under the whole ring.

5. The timepiece (1) according to claim 4, wherein the light guide (10) has a rectangular cross-section, the faces of the guide (10) reflecting light rays (18) to guide them towards the index (5).

6. The timepiece (1) according to claim 4, wherein the light guide (10) has a circular cross-section, the faces of the guide (10) reflecting light rays (18) to guide them towards the index (5).

7. The timepiece (1) according to claim 5, wherein the guide (10) has an upper face (13) connected to the upper cover (9), in permanent contact with the upper cover (9).

8. The timepiece (1) according to claim 7, wherein the exit face (15) is a part of the upper face (13) of the guide (10) facing the index (5).

9. The timepiece (1) according to claim 4, wherein the light source (6) is arranged facing a part of the entry face (12), the light beam (8) being projected from the source (6) around an axis substantially perpendicular to the entry face (12).

10. The timepiece (1) according to claim 1, wherein the guide (10) includes a light deflection structure (16) arranged underneath the index (5) to deflect a part of the light rays (18) towards the index (5).

11. The timepiece (1) according to claim 10, wherein the deflection structure (16) comprises prisms formed in a face (12) of the guide (10).

12. The timepiece (1) according to claim 1, wherein the light guide (10) contains fluorescent and/or phosphorescent pigments to form a secondary source (19) inside the guide (10).

13. The timepiece according to claim 1, wherein the light guide (10) is formed of a one-piece material.

14. The timepiece (1) according to claim 12, wherein the light guide (10) is formed of at least two blocks (20, 21), the fluorescent and/or phosphorescent pigments being placed between the blocks (20, 21).

15. The timepiece (1) according to claim 1, wherein the light source (6) is arranged in the middle part (3) of the case (2) in a permanent location with respect to the case (2).

16. The timepiece (1) according to claim 1, wherein the light guide (10) is arranged at least partly between the light source (6) and the upper cover (9).

17. The timepiece (1) according to claim 1, wherein the movable element (4) includes a filter (23) arranged to dim the brightness or to change the colour spectrum according to the positions of the element (4), the filter preferably being placed between the source (6) and the light guide (10).

* * * * *